May 5, 1936.　　　　J. LELL　　　　2,039,322

SYNCHRONOUS ALTERNATING CURRENT MACHINE FOR LOW AND FOR VARIABLE SPEED

Filed Dec. 30, 1933　　2 Sheets-Sheet 1

INVENTOR
Jacob Lell
By C. P. Goepel
ATTORNEY.

May 5, 1936.  J. LELL  2,039,322
SYNCHRONOUS ALTERNATING CURRENT MACHINE FOR LOW AND FOR VARIABLE SPEED
Filed Dec. 30, 1933  2 Sheets-Sheet 2
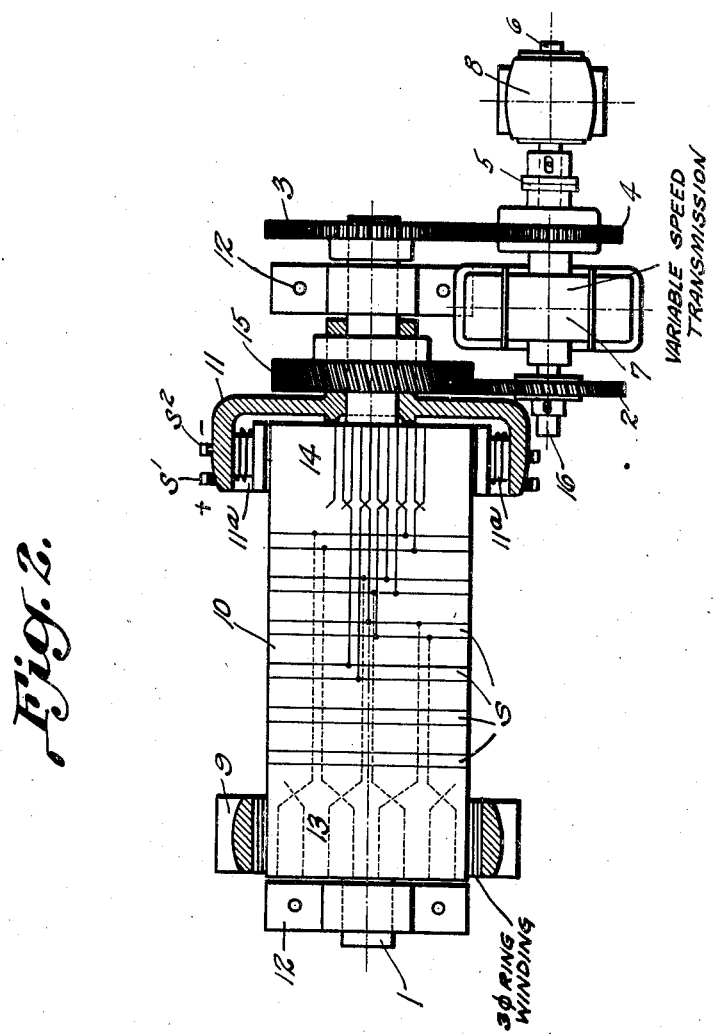

Patented May 5, 1936

2,039,322

UNITED STATES PATENT OFFICE 2,039,322

SYNCHRONOUS ALTERNATING CURRENT MACHINE FOR LOW AND FOR VARIABLE SPEED

Jacob Lell, Heidenheim-on-the-Brenz, Germany

Application December 30, 1933, Serial No. 704,728
In Germany December 31, 1932

5 Claims. (Cl. 172—120)

This invention relates to alternating current machines having synchronous characteristics and designed particularly for use under conditions requiring operation at relatively low and/or variable speeds.

The principles underlying the present invention are applicable to either alternating current generators or motors, and when applied to alternating current generation, it is possible to maintain substantially constant frequency irrespective of variations in speed of the prime mover, and when applied to alternating current motors, it is possible to maintain synchronous operation of the motor throughout a wide range of speed.

Alternating current machines are known which may be coupled to high speed prime movers and which, for this purpose, are provided with squirrel-cage rotors. These machines, however, are not desirable where a constant frequency is essential inasmuch as they are unable to maintain constant frequency in the generated potential during variations of speed of the prime mover.

There are also known alternating current machines in which the stator and rotor revolve in opposite directions so that when both revolve at the same speed, the resulting frequency in the generated potential is twice as high as if only the rotor revolved in a stationary stator. Such machines have the advantage of reducing the number of poles, weight of the rotating parts, and being smaller in dimensions, offer an increased security against detrimental centrifugal forces in the rotating masses. However, machines of this type possess certain undesirable characteristics such as the necessity to pass the whole power through the slip rings and their inability to follow accurately the varying speed of the prime mover. With these facts in mind my invention comprehends a rotary machine operating under the well known principles characterizing synchronous machines, but which permit such machine when operating as a motor to run at varying speeds throughout a wide range and when operating as a generator to generate a current having substantially constant frequency in spite of substantially wide fluctuations in speed of the prime mover.

The invention consists of certain novel features of construction and combination of parts described in the following specification and pointed out more clearly in the appended claims, and I have illustrated in the accompanying drawings a preferred embodiment of my invention, the novel features of which have been set forth more clearly in the appended claims.

Referring to the drawings:

Figure 2 is a plan view, partly in section, of a preferred form of my invention.

Figure 1:
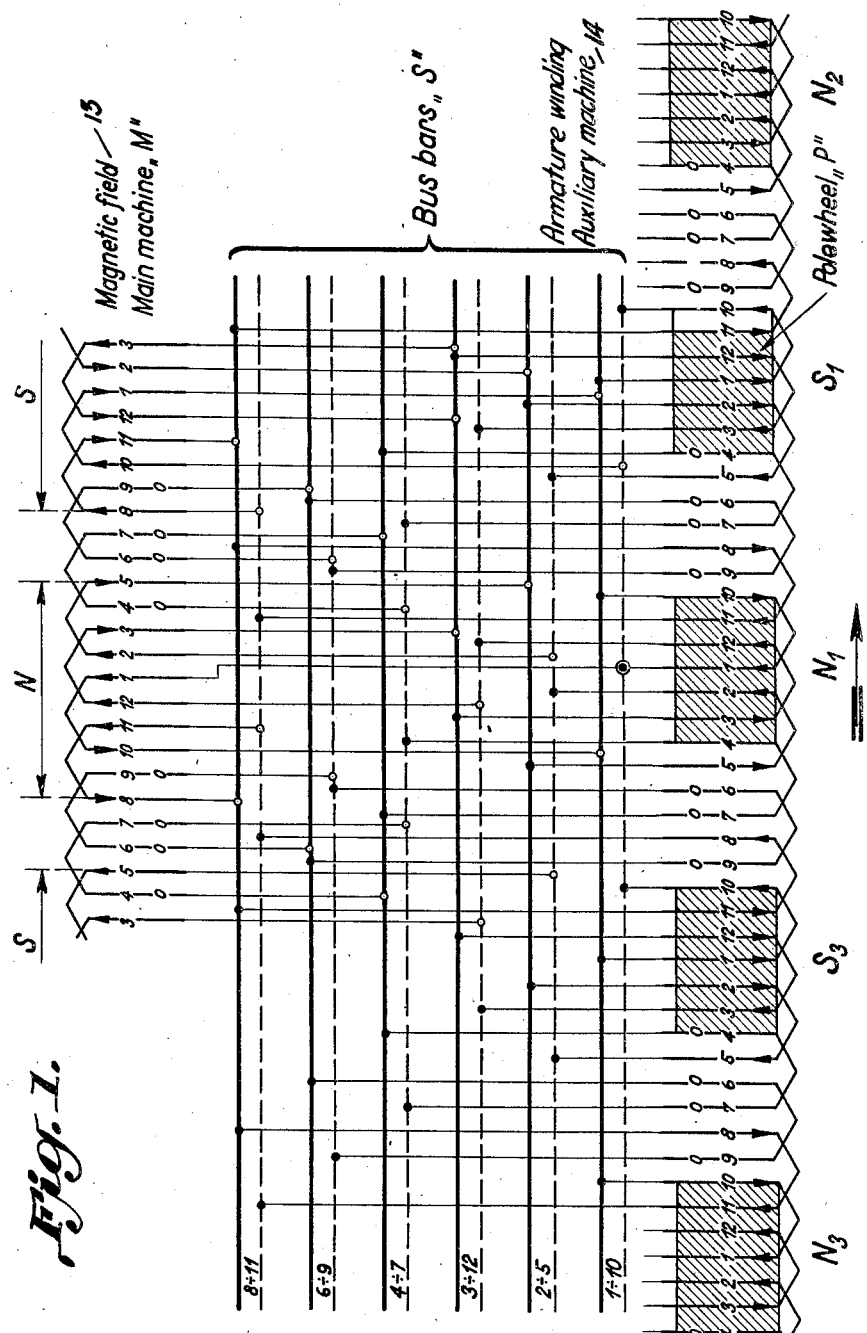
Figure 1 is a schematic diagram of the windings of my machine.

Referring to Fig. 2 of the drawings, wherein I have shown a preferred embodiment of my invention, I have shown a main and an auxiliary machine, the rotating parts of which are connected together by an element indicated by the reference character 10. The element 10 is provided with a shaft 1 mounted in suitable bearings 12 and is arranged to carry on its surface an armature winding 14 and a field winding 13. The field winding 13 is operatively associated with a stator element 9 provided with a conventional three phase ring winding, whereas the armature element 14 is operatively associated with a relatively rotatable field winding 11. The field winding 11 may be provided with any suitable number of poles 11a which may be supplied in any suitable manner with direct current of desirable potential through slip rings $S^1$—$S^2$. The shaft 1 is provided with a suitable driving gear 3 secured thereto, whereas the field element 11 is provided with a driving gear 15. The gear elements 3 and 15 are designed to be driven respectively by gears 4 and 2 connected to a suitable variable speed transmission 7, the latter being operatively connected to a motor 8 by means of a coupling element 5. The gear 2 and its cooperating gear 15 are provided with oblique or spiral teeth permitting slight axial movement of the gear 2 on its shaft 16 by means of the pin and slot connection shown in Fig. 2. The purpose of this axial movement of the gear 2 will be presently explained.

The variable speed transmission device 7 may be of conventional design permitting various relative speeds of the gears 2 and 4, and the coupling device 5 is preferably arranged in a manner such that when open the shaft 6 of the motor may drive the shaft 16 through the transmission device 7. When the coupling member 5 is closed the gear 4 is operatively connected to the transmission device 7 through the pin and slot connection between the right hand member of the coupling 5 as shown in Fig. 2.

The windings 13 and 14 on the rotating element 10 are clearly indicated schematically in Fig. 1. The winding 14 functions as the armature winding for the auxiliary machine comprising the field poles N and the armature 14. The armature winding 14 comprises six poles, corresponding in number to the poles N of the rotating field 11. As shown in Fig. 1, each pole comprises six coils, it being noted that the corresponding coils of each pole are connected to bus bars S, there being twice as many bus bars as there are coils per pole, so that corresponding coils of each pole may be connected, respectively, to the same pair of bus bars. Thus, as seen in Fig. 1, the coils comprising the wires numbered 1 and 10 in each pole are connected to the same pair of bus bars, it being noted that the connections between said coils and the bus bars are reversed in accordance with the polarity of the poles, so that the effective E. M. F.'s induced in said coils are parallelly connected to the respective pairs of bus bars.

The field winding 13 comprises but a single pair of poles as shown in Fig. 1, each pole having six coils, two coils of each pole being connected to each pair of bus bars, as shown. It is to be noted, also, that the armature winding 14 progresses in one direction, whereas the field winding 13 progresses in the opposite direction with reference to the element 10 on which they are both mounted.

Considering the construction shown in Fig. 2, it is apparent that with the movable field element 11 energized by a suitable source of direct current, and assuming there are the same number of poles in the field winding 13 as there are in the windings 11 and 14, the currents induced in the armature 14 and conductively communicated to the fielld 13 will rotate in the opposite direction and at the same speed as the speed of the rotating field element 11. The reversal in direction is caused by the opposite direction of progression of the windings 14 and 13, respectively.

Similarly, if the field element 11 is held fixed and the rotor 10 turned in a direction opposite to that assumed in the preceding example, the currents induced in the field winding 13 will rotate in the same direction as the element 10, but at twice the speed thereof.

With the arrangement of poles shown in the drawings, namely, six poles on the field element 11 and in the armature 14 and only two poles in the field element 13, there will be a corresponding multiplication of speed between the rotating elements 11 and 10 and the resulting rotating field 13. In general, with the winding 13 reversed with reference to that of the armature 14, as shown, and simultaneous rotation of the field element 11 of the rotor 10, the rotary speed of the field 13 will be twice that of the rotor plus that of the pole wheel. Thus, if conditions are selected such that the additive magnetic field speed (double the rotor speed plus the rotary field element speed) is synchronous with the stator rotary field, then upon change of the pole wheel speed the rotor speed will change in such manner as to retain synchronism between the magnetic field set up in the rotary element 10 and the stator rotary field, as in conventional and well known alternating current machines.

If we assume the field element 11 to be rotated in a clockwise direction and the rotor 10 to be rotated in a counter-clockwise direction at the same speeds, then the magnetic field 13 would rotate three times as fast as the rotor if thirty-six coils were present in the magnetic field, but since, instead of thirty-six coils, there are only twelve coils on the magnetic field shown in the drawings, the speed of the latter is tripled, i. e., it rotates under the above-mentioned conditions nine times as fast as the rotary field element 11 or the rotor 10. If, as a result of regulation the rotary field element 11 turns faster or slower than the rotor 10, the condition always obtains that the rotating magnetic field speed is equal to three times the sum of the rotor speed and rotating field element speed.

In operation, the apparatus shown in Fig. 2 may be stated as follows:

Considering the stator winding 9 disconnected from its energizing potential and the rotor 10 and the field element 11 stationary, the coupling 5 is opened so that the motor 8 may drive straight through to the shaft 16 with the gear 2 splined thereon. The motor 8 is then energized and the field element 11 driven at a speed in synchronism with the energizing current of the stator 9. This speed may be attained through proper regulation of the transmission device 7. As soon as the element 11 has reached synchronous speed as stated, the stator 9 is energized, this being effected without any disturbance due to phase displacement between the prevailing currents inasmuch as the oblique gear teeth on the gears 2 and 15 and permissible axial movement of the gear 2 allows the rotor 10 to assume its proper angular position with reference to the rotating field set up in the stator 9 smoothly and without electrical or mechanical disturbance. Under these conditions there is no tendency for the rotor 10 to rotate. This tendency only arises when a relative phase displacement is produced in the line of force between the magnetic field 13 and the stator rotary field. This may be effected by an axial displacement of the gear 2 on the shaft 16 (by any suitable means not shown), and a change in the transmission ratio of the drive mechanism 7. The transmission device 7 is then regulated to cause decreasing speed of the field element 11 until the rotary speed of the gear 4 is substantially equal to that of the motor 8. The motor 8 may now be cut out and the coupling element 5 closed and the machine continues to run like a normal synchronous machine. The speed of the rotor may now be regulated within relatively wide ranges by adjusting the transmission mechanism to change the speed ratio between gears 2 and 4, and this without altering the synchronous relation between the magnetic field 13 and the field of the stator 9.

It is thus apparent that the main machine comprising the stator 9 and the field winding 13 is associated with the auxiliary machine comprising the rotating pole element 11 and the armature winding 14 in a manner such that the rotor 10 functions to simultaneously carry the armature winding 14 in operative relation with reference to the pole elements 10 and the field winding 13 in operative relation with respect to the stator winding 9. Furthermore, when the machine is in operation, the rotor 10 operating through the gear wheels 3 and 4 and the transmission device 7, functions to drive the pole element 11 at varying speeds with reference thereto for the purpose of varying the speed of the element 10 without destroying the synchronous operation thereof with reference to the stator element 9.

I claim:
1. An alternating current machine designed to operate synchronously at relatively low and variable speds comprising a main machine including armature and field windings, and auxiliary machine including armature and field windings, a rotary drum member common to both machines, the armature of the auxiliary machine and the field of the main machine being wound upon said drum member for rotation therewith as a unit with respect to the field of the auxiliary machine and the armature of the main machine, respectively, and conductor means connecting like pole portions of the auxiliary armature winding and the main field winding.

2. The machine described in claim 1 characterized by the fact that the direction of progression of the field winding of the main machine is the reverse of that of the armature winding of the auxiliary machine with which it is connected.

3. The machine described in claim 1 characterized by power transmission means interconnecting said drum member and the field member of the auxiliary machine for positively rotating the field winding of the auxiliary machine from said drum member and in the opposite direction.

4. The machine described in claim 1 characterized by means for driving the field of the auxiliary machine from the armature of the auxiliary machine by a variable speed gearing, and means for fixing said variable speed gearing to provide any desired speed transformation between the driving and driven elements thereof.

5. The machine described in claim 1 characterized by variable speed gear mechanism directly connected between the armature of the auxiliary machine and the field of the auxiliary machine for driving the field from the armature, and means for relatively varying the phase relation of the field with respect to the armature while maintaining the relative speed thereof constant.

JACOB LELL.